United States Patent [19]

Wilcox

[11] Patent Number: 4,882,896
[45] Date of Patent: Nov. 28, 1989

[54] LAWN MOWER

[76] Inventor: Roy E. Wilcox, 7182 E. Carpenter, Davison, Mich. 48423

[21] Appl. No.: 179,673

[22] Filed: Apr. 11, 1988

[51] Int. Cl.⁴ .......................................... A01D 34/78
[52] U.S. Cl. ..................................... 56/10.5; 56/11.9; 56/17.5; 56/320.1
[58] Field of Search ................... 56/17.5, 10.5, 320.1, 56/320.2, 255, 11.9

[56] References Cited

U.S. PATENT DOCUMENTS

| | | | |
|---|---|---|---|
| Re. 24,594 | 1/1959 | Smith | 56/10.5 |
| 3,212,244 | 10/1965 | Wilgus | 56/320.1 X |
| 3,623,305 | 11/1971 | Freedlander et al. | 56/295 |
| 3,945,116 | 3/1976 | Hardin, Jr. | 56/17.5 X |
| 4,064,680 | 12/1977 | Fleigle | 56/320.2 X |
| 4,145,864 | 3/1979 | Brewster, Jr. | 56/10.2 |
| 4,176,508 | 12/1979 | Baumann et al. | 56/17.5 X |
| 4,250,623 | 2/1981 | Pittinger et al. | 30/347 |
| 4,301,642 | 11/1981 | Thurber | 56/12.7 |
| 4,333,302 | 6/1982 | Thomas et al. | 56/10.5 |
| 4,356,686 | 11/1982 | Lessig | 56/295 |
| 4,781,014 | 11/1988 | Conboy, Jr. et al. | 56/10.5 X |

Primary Examiner—Hoang C. Dang
Attorney, Agent, or Firm—Gifford, Groh, Sheridan, Sprinkle and Dolgorukov

[57] ABSTRACT

A lawn mower having a housing with a top, a bottom and a cutting chamber which is open to the bottom. A plurality of wheels are rotatably mounted to the housing and support the housing upon a ground surface while a push bar extends upwardly and outwardly from the housing to enable the housing to be maneuvered by a person utilizing the lawn mower. An electric motor has an output shaft and a long cutting element is secured to the output shaft. The electric motor is detachably secured to the housing so that, upon attachment, the cutting element is positioned within the cutting chamber of the lawn mower. An electric rechargeable battery is also attached to the motor.

6 Claims, 1 Drawing Sheet

U.S. Patent
Nov. 28, 1989
4,882,896
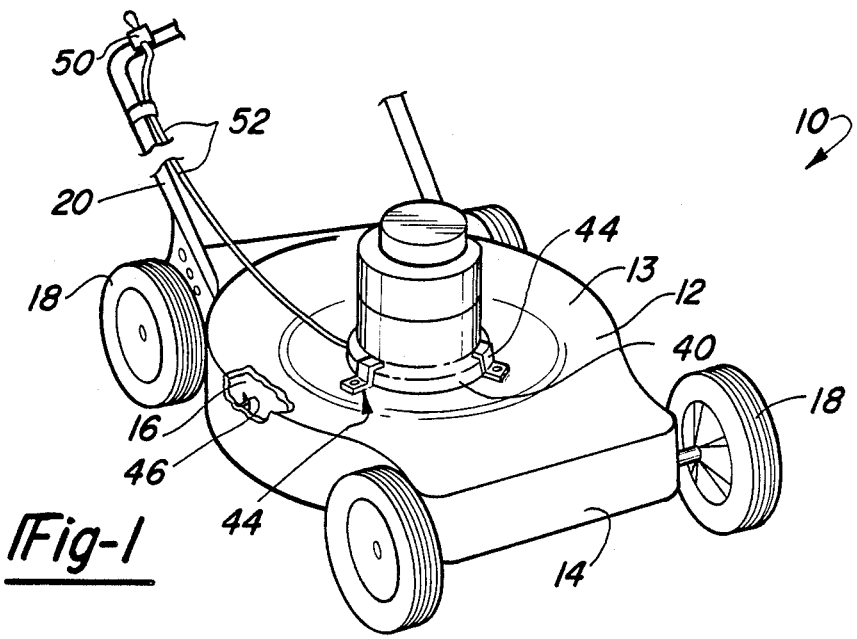
*Fig-1*
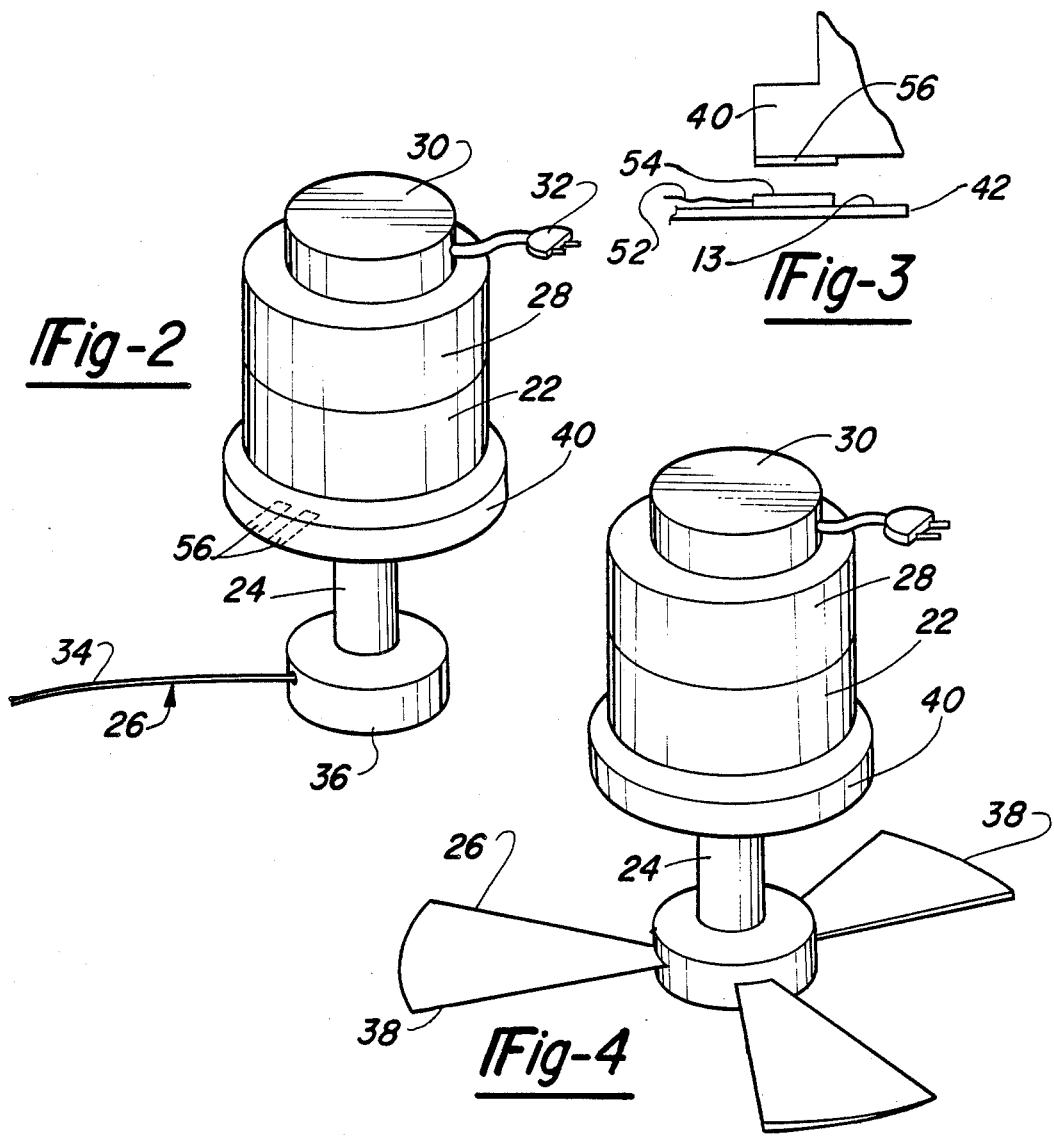
*Fig-2*
*Fig-3*
*Fig-4*

LAWN MOWER

BACKGROUND OF THE INVENTION

I. Field of the Invention

The present invention relates generally to lawn mowers and, more particularly, to an electrically powered lawn mower which utilizes a rechargeable battery.

II. Description of the Prior Art

There are many types of previously known lawn mowers. One type of previously known lawn mowers utilizes a gasoline powered engine in order to rotatably drive the lawn mower blade. Such lawn mowers are disadvantageous for a number of different reasons.

One disadvantage of these previously known lawn mowers is that they are expensive to purchase and difficult to maintain. In particular, periodic engine tune ups are frequently required for these engines as well as oil changes, carburetor adjustments and the like.

A still further disadvantage of these previously known lawn mowers with gasoline engines is that they are dangerous to operate. This is particularly true for such lawn mowers which utilize rigid cutting blades.

There have, however, been a number of previously known lawn mowers which utilize electric motors to rotatably drive the cutting element. These previously known electrically powered lawn mowers typically use an elongated extension cord which is connected at one end to the lawn mower and, at its other end, to a source of house current. Such electrically powered lawn mowers, however, are also disadvantageous for a number of different reasons.

One disadvantage of these previously known electrically powered lawn mowers is that a very long extension cord is oftentimes required in order to reach all locations of the lawn. Furthermore, the electrical extension cord can become wrapped around the objects in the lawn such as trees, fences, gardens and the like. When this happens, the lawn mower must be stopped and the cord unwound or untangled from the object before the lawn mowing can be completed.

SUMMARY OF THE PRESENT INVENTION

The present invention provides an electrically powered lawn mower which overcomes all of the above mentioned disadvantages of the previously known devices.

In brief, the lawn mower of the present invention comprises a housing having a top, a bottom and defining a cutting chamber which is open to the bottom of the housing. A plurality of wheels are rotatably mounted to the housing and support the housing on the ground surface. A push bar is also connected to and extends both upwardly and outwardly from the housing to enable the housing to be easily maneuvered by the user.

An electric motor having an output shaft is detachably secured to the housing so that, when attached, the cutting element is positioned within the cutting chamber. This cutting element can comprise, for example, a strand or plastic cutting blades.

A rechargeable electrical battery is also mounted to the electric motor in order to provide power to the electric motor. The battery is thus attached to and removed from the lawn mower housing in unison with the motor.

In one embodiment of the invention, a pair of electric terminals on the electric motor cooperate with a pair of electric terminals on the housing top in order to electrically connect an electric switch in series between the battery and the motor. This electric switch preferably is mounted to the push bar for the lawn mower so that the electric motor can be turned on and off as desired by the user by actuating the electric switch.

In operation, in order to use the lawn mower, the electric motor together with its battery is attached to the housing so that the cutting element is positioned within the cutting chamber. The electric switch is then moved to its on position thus activating the motor and rotatably driving the cutting element. Then, as the housing is pushed over the lawn surface by the push bar, the lawn is cut in the conventional fashion.

When the lawn cutting is completed, the motor together with the battery can be easily detached from the housing and plugged into an electrical outlet in order to recharge the battery for the next lawn mowing operation.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a fragmentary perspective view illustrating a preferred embodiment of the present invention;

FIG. 2 is a perspective view illustrating a portion of a preferred embodiment of the present invention;

FIG. 3 is a fragmentary exploded view illustrating a portion of a preferred embodiment of the present invention; and FIG. 4 is a view similar to FIG. 2 but illustrating a modification thereof.

DETAILED DESCRIPTION OF PREFERRED EMBODIMENTS OF THE PRESENT INVENTION

With reference first to FIG. 1, a preferred embodiment of the lawn mower 10 of the present invention is thereshown and comprises a lawn mower housing 12 having a top 13, a bottom 14 and defining a generally cylindrical cutting chamber 16 which is open to the bottom 14. A plurality of wheels 18 are rotatably mounted to the housing 12 and support the housing 12 on a ground surface. A push bar 20 is also preferably secured to and extends both upwardly and outwardly from one end of the housing 12. This push bar 20 enables the user to maneuver the lawn mower 10 in the desired fashion.

With reference now to FIGS. 1 and 2, the lawn mower further comprises an electric motor 22 which rotatably drives an output shaft 24 upon activation. A cutting element 26 which will subsequently be described in greater detail, is attached to the shaft 24.

Referring now particularly to FIG. 2, an electric rechargeable battery 28 is secured to the motor 22 and is electrically connected to the motor 22 to power it in a fashion to be subsequently described. A battery charger 30 is attached to the battery 28 and operates to recharge the battery 28 when its electrical cord 32 is plugged into a conventional electrical outlet or house current.

With reference now to FIGS. 2 and 4, the electrical cutting element 26 is preferably a strand 34 which is connected to the output shaft 24 through a conventional feed out reel 36. Alternatively, the cutting element 26 can comprise a plurality of blades 38 secured to the shaft 24. Preferably these blades 28 are made of a flexible material, such as plastic, so that the likelihood of personal injury is minimized.

With reference now particularly to FIGS. 1-3, the motor 22 includes an outwardly extending mounting flange 40 adjacent its lower end. This mounting flange 40 is adapted to abut against the top 13 of the housing 12 and so that the shaft 24 together with its attached cutting element 26 extends through an opening 42 (FIG. 3) in the housing 12. Upon doing so, the cutting element 26 is positioned within the cutting chamber 16 for the housing 12.

With reference now to FIG. 1, a plurality of clamps 44 are mounted to the top )3 of the lawn mower housing and engage the flange 40 on the electric motor 22 in order to detachably secure the motor 22 to the housing 12. Simultaneously, the cutting element 26 is positioned within the cutting chamber 16 in the desired fashion.

With reference now to FIG. 1, in the event that the cutting element 26 comprises the strand 34 (FIG. 2), preferably a cutting blade 46 is secured to the lawn mower housing. This cutting blade 46 registers with the strand 34 and cuts the end of the strand 34 whenever it exceeds a predetermined length. Thus, the cutting blade 46 maintains the cutting strand 34 at or less than a predetermined maximum length.

With reference now to FIGS. 1-3, an electric switch 50 is preferably connected to the push bar 20 and is connected by electric wires 52 to two electric terminals 54 (only one shown in FIG. 3) on the top surface 12 of the lawn mower housing. These electric terminals 54 register with two like electric terminals 56 on the bottom of the electric motor flange 40 when the electric motor 22 is attached to the lawn mower housing 12 by the clamps 44.

The cooperation between the electric terminals 56 and 54 electrically connect the switch 50 in series between the rechargeable battery 28 and the electric motor 20. Consequently, the electric motor 22 can be turned on and off by the switch 50 on the push bar 20.

In operation, in order to mow the lawn the electric motor is detachably secured to the lawn mower housing by the clamps 44. The switch 50 is activated, as required, in order to turn on the motor 22 and thereby mow the lawn.

When the lawn is mowed, the electric motor 22, together with its battery 28 and recharger 30, is removed from the lawn mower housing and the electric cord 32 is plugged into an electrical receptacle to thereby recharge the electric battery for the next use in lawn mowing.

From the foregoing, it can be seen that the present invention provides a simple and yet highly effective electric lawn mower utilizing an electric rechargeable battery which overcomes all of the disadvantages of the previously known devices.

Having described my invention, however, many modifications thereto will become apparent to those skilled in the art to which it pertains without deviation from the spirit of the invention as defined by the scope of the appended claims.

I claim:
1. A lawn mowing device comprising
a housing having a top, a bottom, and a cutting chamber open to said bottom,
a plurality of wheels rotatably mounted to said housing for supporting said housing on a ground surface,
an electric motor having an output shaft,
an electric battery mounted to said electric motor and means for electrically connecting said battery to said motor,
a lawn cutting element secured to said output shaft,
means for detachably securing said motor to said housing so that said cutting element is positioned in said cutting chamber and
a battery charger mounted to said motor having means for electrically connecting said battery charger to household current, said battery charger being electrically connectable to household current when said motor is detached from said housing.

2. The invention as defined in claim 1 wherein said cutting element comprises a strand.

3. The invention as defined in claim 2 and comprising a cutting blade secured to said housing for limiting the length of said strand.

4. The invention as defined in claim 1 wherein said cutting element comprises a blade made of flexible material.

5. A lawn mowing device comprising
a housing having a top, a bottom, and a cutting chamber open to said bottom,
a plurality of wheels rotatably mounted to said housing for supporting said housing on a ground surface,
an electric motor having an output shaft,
an electric battery and means for electrically connecting said battery to said motor,
a lawn cutting element secured to said output shaft,
means for detachably securing said motor to said housing so that said cutting element is positioned in said cutting chamber,
a push bar mounted to said housing,
a switch mounted to said push bar, and
wherein said electrical connecting means having means for automatically electrically connecting said switch in series between said motor and said battery upon attachment of said motor to said housing.

6. The invention as defined in claim 5 wherein said automatic electrical connection means comprises a pair of terminal strips on said housing and a pair of cooperating terminal strips on said motor.

* * * * *